Patented Dec. 10, 1929

1,738,956

UNITED STATES PATENT OFFICE

PAUL MAHLER, OF NEW YORK, N. Y., ASSIGNOR TO ALBERENE STONE CO., OF NEW YORK, N. Y., A CORPORATION OF NEW YORK

PROCESS OF HARDENING ALBERENE STONE

No Drawing.   Application filed February 26, 1927. Serial No. 171,369.

This invention relates to a process or method of treating alberene stone for the purpose of hardening the same. Alberene stone is a mineral found in a natural state in various localities and consists of combinations of silicates, some if not all of which contain water of composition. It is a variety of talc or soapstone. As found in its natural state, this so-called alberene stone varies in hardness. This variation in the hardness of the stone is one of the characteristics thereof which determines the use to which the various grades of the stone may be utilized in the arts. The softer variety of the stone is suitable for fire brick, for example, the varieties of intermediate hardness may be used for wash tubs and similar purposes, while the harder varieties of the stone may be employed for example as stair treads. As the alberene stone is found in its natural state, even the hardest varieties thereof are relatively soft, that is they may be readily scratched even by the use of a blunt instrument, and so far as I am aware, there is no form of alberene stone which in its natural state cannot be scratched by means of a copper coin. Consequently, the hardest variety of alberene stone would be classified as having a scale of hardness between II and III in the accepted Mohs' scale. The great majority of the grades of alberene stone, however, may be scratched much more easily, and in fact, talc which alberene stone probably resembles the closest, is one of the softest of known minerals.

The object of my invention is to so treat alberene stone as to increase its hardness to the extent that it may be used for substantially any purpose in the arts where the use of an exceedingly hard substance is required. For example, after the alberene stone is subjected to the method of treatment comprising the present invention the material is sufficiently hard to be employed as floor tiling and is especially adapted for this use in industrial plants wherein the constant use from wear and tear and possible chemical action becomes a serious factor, making other forms of floor, for instance, cement or concrete floors, unsuitable. After various grades of the alberene stone are treated as hereinafter described, the hardness thereof is such that it may be employed in lieu of alundum and carborundum for emery wheels for example, and in numerous other instances where substances of exceeding hardness are required in various arts. In fact, after being treated, as hereinafter described, the alberene stone becomes so hard that it is difficult to scratch it with sapphire, which next to the diamond, is believed to be the hardest mineral known, that is to say after being treated the alberene stone assumes a hardness close to IX in the Mohs' scale of hardness, whereas the diamond has a relative hardness of X. So far as I know all previous attempts to make a useful product by hardening a natural stone of this character has resulted in failure because the heating to the high temperature necessary for driving off the water of composition has resulted in the development of checks or cracks, the flaking or breaking off of parts of the stone or even the complete splitting of the stone.

I have found that by subjecting alberene stone to a temperature which is preferably gradually increased to a predetermined maximum, it is possible to remove substantially all of the water of composition from predetermined silicates contained therein and without cracking or otherwise injuring the stone, and that when the lowest possible temperature for removing the water of composition from predetermined silicates is reached this temperature should not be materially increased until all the water of composition from the predetermined silicates has been removed therefrom, it being understood that the removal of the water of composition is effected by its volatilization due to the temperature attained.

The amount of volatiles in alberene stone varies between wide limits, generally the softer varieties of the stone contain considerably more water of composition than the harder varieties of the stone. The temperature necessary for the volatilization of the water of composition also varies with the hardness of the stone, generally being higher in the harder stone than in the softer varieties of the stone. I have found that after the water of composition begins to go off from one of the group of silicates in a given variety of stone it is not necessary to further increase the temperature more than 100° F. in order to remove substantially the entire water of composition in this particular group of silicates, and in fact, in carrying out the process it is necessary to use great care in maintaining the temperature rise within such limits so as to prevent any cracking in the stone. I have found that after the first loss of the volatiles in a certain group of silicates is ended the continued heating of the stone even at higher temperatures does not cause any further appreciable loss of weight. Nevertheless, I have also found that further increase of temperature may produce a new volatilization of the water of composition in another group of silicates as contained in the stone under treatment, which indicates that the stone contains various groups of silicates each having its water of composition which begins to volatilize at different temperatures, the temperature for one group being higher than that for another group. In general practise, however, the successive groups of silicates after the water of composition has been removed from the first group contain relatively much smaller quantities of water of composition, and therefore, do not materially enhance the results obtained in carrying out the improved method or process of treating the stone. I have also discovered that it is not absolutely necessary to remove all of the water of composition in any instance from any one or more of the groups of silicates contained in the stone in order to effect a sufficient hardness in the stone to make the same practical for the purposes intended. It will be understood that the temperature to which any given variety of the alberene stone must be subjected and the time required for the treatment in carrying out the process will depend substantially in a direct ratio to the volume, that is the cubical contents of the stone undergoing the treatment. As a concrete example, for instance, the stone may be cut into slabs approximately $3 \times 5 \times \frac{1}{2}''$ in thickness and heated to a temperature of approximately 950° F. which temperature is maintained substantially constant or is only slightly increased for a period of approximately four and one-half hours, after which a so-called first stage of treatment is completed and substantially all of the water of composition is volatilized from one of the groups of silicates forming the stone. In this treatment of the stone there is of course, a corresponding percentage of loss of weight which in the example given may vary between 6 and 7%.

If it is necessary or advisable in any instance to further carry on the treatment the temperature may be increased gradually for 200 or 300 or more degrees F. until the water of composition of another group of silicates in the stone begins to volatilize and pass off, and then this subsequent temperature is reached and is maintained practically constant until substantially all the water of composition of the second group of silicates is volatilized. The time and the temperatures vary with different types of stone and naturally also depend upon the cubic contents and the shape of the stone being treated. This process may be further carried on if necessary to include other and all the various groups of silicates which may be included in the composition of the stone as found in its natural state. From the foregoing, it will be understood that irrespective of the number of groups of silicates containing water of composition that may be included in the natural alberene stone and irrespective of the number of groups of silicates which may be included in carrying out the process, the temperature to which the stone is subjected is sufficiently high to effect the volatilization of the water of composition of any group of silicates and this temperature is maintained substantially constant or only increased slightly until all the water of composition or substantially all the water of composition of any particular group of silicates is volatilized. As will furthermore be understood in carrying out the invention successfully, it is first necessary to ascertain the temperatures and the periods of time for effecting the volatilization of the water of composition in the various groups of silicates which may be contained in the stone of the particular type to be treated.

The alberene stone treated in the manner hereinbefore described is changed from a relatively soft to a material which is relatively so hard that it may be used for substantially any purpose in the arts in which a hard material is required, and moreover, the material thus treated is one which for example is particularly adapted for use as fire brick as it will not split and crack, and also for use as flooring in the shape of tiles or otherwise, inasmuch as it is so hard as to be substantially impervious to normal wear and also to the action of chemicals, which in laboratories for example, are more or less often spilled on the floor.

The material is not only hard as above indicated, but also has the advantage that it is capable of absorbing a dye, pigment or other coloring matter whereby the product may be given a color or tint which is not possible with the untreated stone.

It is to be understood that the term alberene stone, as herein employed, is defined as any mineral in its natural state in the composition of which there is at least one or more groups of silicates.

I claim as my invention:

1. A process of hardening a piece of natural stone of the soapstone type containing a group of silicates and water of composition consisting in subjecting the piece of stone to a temperature only sufficiently high to volatilize the water of composition of the group of silicates, and then maintaining the said temperature practically constant until substantially all the water of composition of the said group of silicates is volatilized.

2. A process of increasing the hardness of a natural mineral substance containing a group of silicates and water of composition, said increase in hardness being from between II to III on the standard of the Mohs' scale to nearly IX on said scale, said process consisting in subjecting units of predetermined volume of the substance to a temperature only sufficiently high to volatilize the water of composition in the said group of silicates, and then maintaining the said temperature practically constant until substantially all the water of composition of the said group of silicates is volatilized.

3. A process of hardening a stone of the soapstone type containing a group of silicates and water of composition consisting in subjecting units of the substance to a rising temperature only until the water of composition of the said group of silicates begins to volatilize, and then maintaining the said volatilization temperature practically constant until substantially all the water of composition of the said group of silicates is volatilized.

4. A process of hardening a piece of soapstone containing groups of silicates and water of composition consisting in subjecting the soapstone to a heat only sufficiently high to volatilize the water of composition of a certain group of silicates, maintaining the said temperature practically constant until substantially all of the water of composition of the said group of silicates is volatilized, then subjecting the substance to a higher heat only sufficient to volatilize the water of composition of another group of silicates, and then maintaining the said increased temperature practically constant until substantially all the water of composition of the said second group of silicates is volatilized.

5. A process of hardening a substance containing groups of silicates consisting in subjecting the substance to a rising temperature until a heat sufficiently high is reached to merely volatilize the water of composition of a certain group of silicates, maintaining the said temperature practically constant until substantially all of the water of composition of the said group of silicates is volatilized, then further raising the temperature until a heat sufficiently high is reached to merely volatilize the water of composition of another group of silicates, and then maintaining the said increased temperature practically constant until substantially all the water of composition of the said second group of silicates is volatilized.

6. A process of hardening a substance containing groups of silicates consisting in subjecting units of predetermined volume of the substance to a rising temperature until a heat only sufficiently high is reached to cause the water of composition in the said group of silicates to begin to volatilize, then maintaining the said volatilization temperature practically constant until substantially all the water of composition of the said group of silicates is volatilized, then subjecting the substance to a further rising temperature only until a heat is reached at which the water of composition of another group of silicates begins to volatilize, and then maintaining the said increased temperature practically constant until substantially all of the water of composition of the said second group of silicates is volatilized.

7. The process of hardening stone of the soapstone type, including a plurality of groups of hydrated silicates, consisting in driving off the water from different silicate groups separately and in succession by heating the stone to successively increasing temperatures under controlled conditions as to time and temperature.

8. The process of treating a mineral substance of the soapstone type containing a plurality of groups of hydrated silicates, consisting in subjecting said substance to a plurality of successively higher temperatures through a predetermined time period, the rate of temperature increase being controlled to drive off the water of composition from different silicate groups in succession.

Signed by me this 17th day of February 1927.

PAUL MAHLER.